(12) United States Patent
French

(10) Patent No.: US 6,879,347 B1
(45) Date of Patent: Apr. 12, 2005

(54) METHOD AND APPARATUS FOR COMMUNICATING STATE INFORMATION USING VERTICAL BLANKING INTERVAL

(75) Inventor: Kelly S. French, Hurst, TX (US)

(73) Assignee: Gateway, Inc., Irvine, CA (US)

( * ) Notice: Subject to any disclaimer, the term of this patent is extended or adjusted under 35 U.S.C. 154(b) by 0 days.

(21) Appl. No.: 09/475,220

(22) Filed: Dec. 30, 1999

(51) Int. Cl.$^7$ .......................... H04N 7/08; H04N 7/084; H04N 7/087
(52) U.S. Cl. ...................... 348/473; 348/474; 348/476; 348/478; 348/460; 725/141
(58) Field of Search ................................ 348/473, 474, 348/476, 477, 478, 479, 460, 461, 465, 734, 552; 725/133, 141, 153, 80

(56) References Cited

U.S. PATENT DOCUMENTS

| | | | |
|---|---|---|---|
| 4,507,683 A | 3/1985 | Griesshaber et al. ........ 358/185 |
| 4,554,579 A | 11/1985 | Citta ........................... 358/86 |
| 4,578,718 A | 3/1986 | Parker et al. |
| 4,821,032 A | 4/1989 | Shimada et al. |
| 5,375,160 A | 12/1994 | Guidon et al. ................ 379/52 |
| 5,410,326 A | 4/1995 | Goldstein .................... 348/134 |
| 5,479,617 A | 12/1995 | Nei .......................... 395/200.2 |
| 5,488,409 A | 1/1996 | Yuen et al. .................... 348/5 |
| 5,532,732 A | 7/1996 | Yuen et al. .................... 348/1 |
| 5,638,113 A | 6/1997 | Lappington et al. .......... 348/12 |
| 5,659,367 A | * | 8/1997 | Yuen ......................... 348/465 |
| 5,764,275 A | 6/1998 | Lappington et al. .......... 348/12 |
| 5,813,913 A | 9/1998 | Berner et al. ................. 463/40 |
| 6,041,016 A | * | 3/2000 | Freker ..................... 365/238.5 |
| 6,347,154 B1 | * | 2/2002 | Karanovic et al. .......... 382/233 |
| 6,400,280 B1 | * | 6/2002 | Osakabe ..................... 348/734 |
| 6,407,779 B1 | * | 6/2002 | Herz .......................... 348/734 |
| 6,408,435 B1 | * | 6/2002 | Sato ........................... 348/734 |
| 6,424,947 B1 | * | 7/2002 | Tsuria et al. ................ 348/734 |

FOREIGN PATENT DOCUMENTS

EP    0 516 378 A1    12/1992

* cited by examiner

Primary Examiner—John Miller
Assistant Examiner—Trang U Tran
(74) Attorney, Agent, or Firm—Jeffery A. Proehl; Kevin E. West; Suiter-West

(57) ABSTRACT

An information handling system controls a signal processing device by providing a control signal to the signal processing device. The control signal may be transmitted to the signal processing device as an infrared or R/F signal that is received and decoded by the signal processing device. The signal processing device is capable of receiving and processing an input signal, and is further capable of providing an output signal to the information handling system. In response to the control signal, the signal processing device encodes data onto the output signal provided to the information handling system, and the information handling system is capable of decoding the data from the output signal. The data encoded onto the output signal may include status information from the signal processing device, including the status of execution of the control signal. In one embodiment, the output signal is a video signal, such as the case where the signal processor is a VCR or the like, and the data is encoded onto a vertical blanking interval of the video signal such that state information is communicated from the signal processor to the information handling system via the vertical blanking interval.

22 Claims, 3 Drawing Sheets

METHOD AND APPARATUS FOR COMMUNICATING STATE INFORMATION USING VERTICAL BLANKING INTERVAL

FIELD OF THE INVENTION

The present invention generally relates to the field of information handling systems, and particularly to communicating information between an information handling system and a device coupled to the information handling system.

BACKGROUND OF THE INVENTION

The convergence of personal computer type information handling systems and television based information handling systems such as television tuners, videocassette recorders (VCRs), video laser disc player, digital versatile disk (DVD) players, and the like, have resulted in video information viewing systems with expanded features and capabilities and are often referred to as PC/TV's or convergence devices. In a typical convergence device, a personal computer core system is expanded to include hardware and software for coupling with and controlling standard video devices that provide standard video signals. For example, a convergence device may include a peripheral card that includes inputs for receiving the video and audio output provided by a VCR such that the video and audio signals may be processed and displayed or reproduced by the convergence device. The VCR, conforming with previously existing standards, receives infrared (IR) input commands from a control device capable of providing IR encoded input commands for controlling the VCR (e.g., record, play, stop, tune to specified television channels, etc.), for example a remote control device. The convergence device may include an infrared data encoder and transmitter for transmitting control commands from the convergence device to the VCR. However, more likely than not, the VCR is capable of receiving input commands and data only, and is not capable of returning information such as state data to the control device. The only outputs provided by a standard VCR are the video and audio signals. Thus, a device that is controlling a video device such as a VCR is not provided with data regarding the state or status of the video device, e.g., whether a received command was verified and successfully implemented, thereby making verification of control of the device difficult if not limited or impossible.

Encoding of information within a video signal has been implemented by previous systems. For example, Electronic Industry Association (EIA) standard EIA-608 defines a protocol for the transmission of data such as closed captioning information on field 2, line 21, of the vertical blanking interval (VBI) of a National Television Standards Committee (NTSC) video signal. Typically, an encoder at the broadcaster's location encodes closed captioning information into a video signal to be transmitted. A television receiver or VCR having a closed captioning decoder optionally decodes the encoded closed captioning data from the video signal and displays the data (i.e. text) on a portion of the television screen such that a subtitled text relating to words spoken in a program are available to hearing impaired viewers. Thus, the VBI encoding system is utilized to provide supplemental data in a broadcast television receiver. However, to date, no known system utilizes the vertical blanking interval to encode state information regarding a video device and to send the state information to a convergence device or PC/TV that controls the video device.

SUMMARY OF THE INVENTION

The present invention is directed to a system for communicating state information between a device and an information handling system that controls the device. In one embodiment, the system includes a signal processor for receiving a signal to be processed and an information handling system for receiving an output signal provided by the signal processor wherein the output signal is representative of at least a portion of the input signal. The information handling system provides a control signal to the signal processor and the signal processor encodes data onto the output signal in response to the control signal such that the encoded data is decodable by the information handling system. In another embodiment, the signal processor provides a video signal to the information handling system and the data is encoded in a vertical blanking interval of the video signal. The data may be indicative of the status of signal processor, including the status of execution of the command received by the information handling system. In one embodiment, the signal processing device is a VCR or similar device having an infrared control interface.

The present invention is further directed to a method for communicating state information between a device and an information handling system that controls the device. In one embodiment, the method includes steps for transmitting a control signal to a signal processor from an information handling system that controls the signal processor, receiving and decoding the control signal, providing an output signal from the signal processor to the information handling system, and encoding data onto the provided output signal in response to the control signal. The information handling system decodes the data from the output signal, and the data may be indicative of a the status of the signal processor, including a status of execution of the command signal. In one embodiment, the method is implemented on a signal processing device such as VCR or similar device having an infrared control interface. In a further embodiment, the method is implemented as a program of instructions storable on a computer readable medium for causing an information handling system to execute the steps of the method. In a particular embodiment, the method includes steps for encoding the data in an available vertical blanking interval of the output signal, and, in the event a vertical blanking interval is not available, interleaving the data in a previously existing data packet.

It is to be understood that both the forgoing general description and the following detailed description are exemplary and explanatory only and are not restrictive of the invention as claimed. The accompanying drawings, which are incorporated in and constitute a part of the specification, illustrate an embodiment of the invention and together with the general description, serve to explain the principles of the invention.

BRIEF DESCRIPTION OF THE DRAWING

The numerous advantages of the present invention may be better understood by those skilled in the art by reference to the accompanying figures in which.

DETAILED DESCRIPTION OF THE INVENTION

Reference will now be made in detail to the presently preferred embodiment of the invention, an example of which is illustrated in the accompanying drawings.

Figure 1:
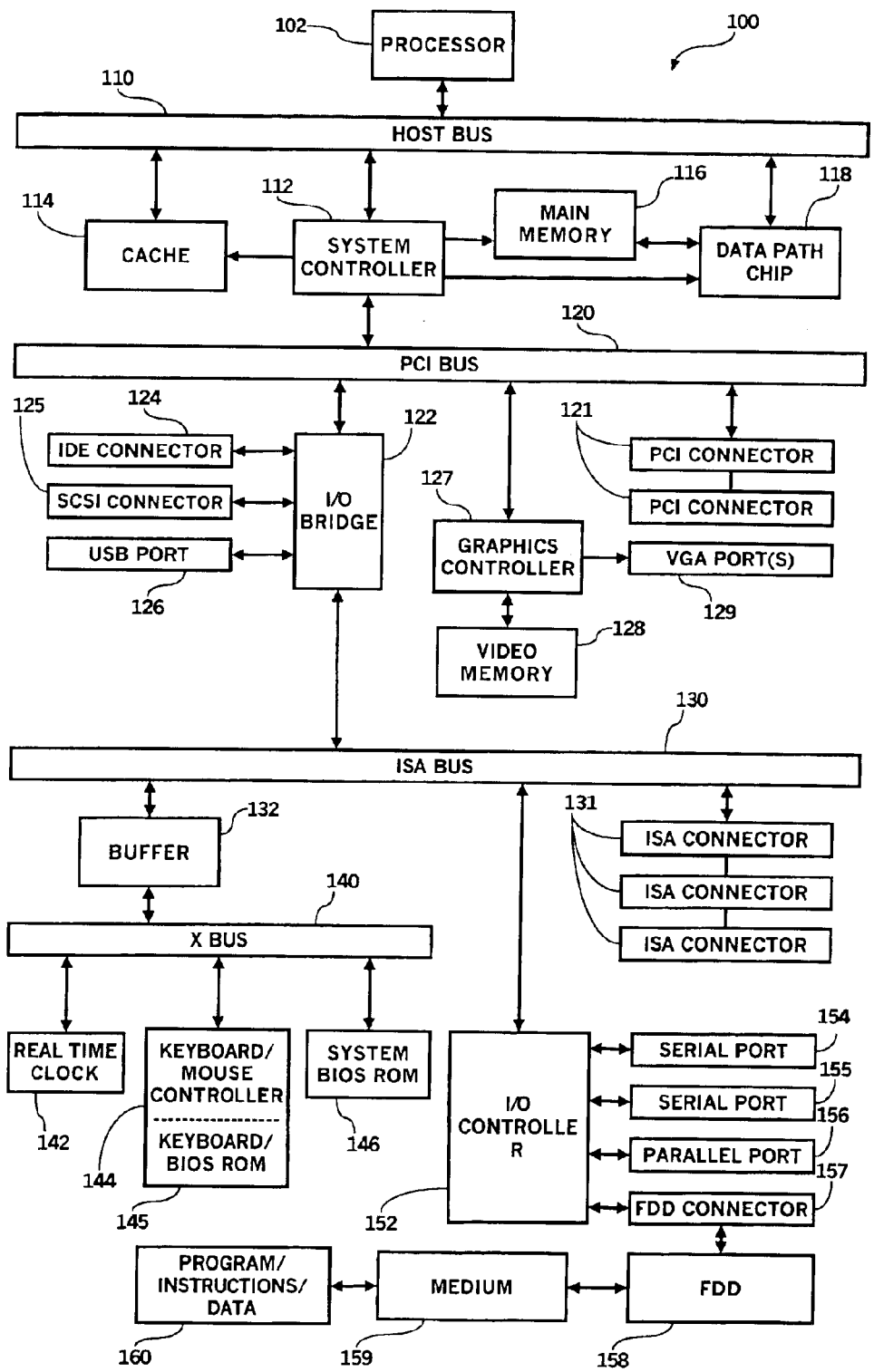
FIG. 1 is a block diagram of an information handling system operable to tangibly embody the present invention.

FIG. 1 shows a block diagram of an information handling system 100 in accordance with the present invention. In this embodiment, processor 102, system controller 112, cache 114, and data-path chip 118 are each coupled to host bus 110. Processor 102 is a microprocessor such as a 486-type chip, a Pentium®, Pentium II®, Pentium III®, or the like suitable microprocessor. Cache 114 provides high-speed local-memory data (in one embodiment, for example, 512 KB of data) for processor 102, and is controlled by system controller 112, which loads cache 114 with data that is expected to be used soon after the data is placed in cache 112 (i.e. in the near future). Main memory 116 is coupled between system controller 112 and data-path chip 118, and in one embodiment, provides random-access memory of between 16 MB and 128 MB of data. In one embodiment, main memory 116 is provided on SIMMs (Single In-line Memory Modules), while in another embodiment, main memory 116 is provided on DIMMs (Dual In-line Memory Modules), each of which plugs into suitable sockets provided on a motherboard holding these components and many of the other components shown in FIG. 1. Main memory 116 includes standard DRAM (Dynamic Random-Access Memory), EDO (Extended Data Out) DRAM, SDRAM (Synchronous DRAM), or the like suitable memory technology. System controller 112 controls PCI (Peripheral Component Interconnect) bus 120, a local bus for system 100 that provides a high-speed data path between processor 102 and various peripheral devices, such as video, disk, network, etc. Data-path chip 118 is also controlled by system controller 112 to assist in routing data between main memory 116, host bus 110, and PCI bus 120.

In one embodiment, PCI bus 120 provides a 32-bit-wide data path that runs at 33 MHz. In another embodiment, PCI bus 120 provides a 64-bit-wide data path that runs at 33 MHz. In yet other embodiments, PCI bus 120 provides 32-bit-wide or 64 bit-wide data paths that run at higher speeds. In one embodiment, PCI bus 120 provides connectivity to I/O bridge 122, graphics controller 127, and one or more PCI connectors 121, each of which accepts a standard PCI card. In one embodiment, I/O bridge 122 and graphics controller 127 are each integrated on the motherboard along with system controller 112, in order to avoid a board-to-connector-to-board signal crossing interface and thus provide better speed and reliability. In the embodiment shown, graphics controller 127 is coupled to a video memory 128 that includes memory such as DRAM, EDO DRAM, SDRAM, or VRAM (Video Random-Access Memory), and drives VGA (Video Graphics Adapter) port 129. VGA port 129 can connect to VGA-type or SVGA (Super VGA)-type displays or the like. Other input/output (I/O) cards having a PCI interface can be plugged into PCI connectors 121.

In one embodiment, I/O bridge 122 is a chip that provides connection and control to one or more independent IDE connectors 124-125, to a USB (Universal Serial Bus) port 126, and to ISA (Industry Standard Architecture) bus 130. In this embodiment, IDE connector 124 provides connectivity for up to two or more standard IDE-type devices such as hard disk drives, CD-ROM (Compact Disk-Read-Only Memory) drives, DVD (Digital Video Disk or Digital Versatile Disk) drives, or TBU (Tape-Backup Unit) devices. In one similar embodiment, two IDE connectors 124 are provided, and each provide the EIDE (Enhanced IDE) architecture. In the embodiment shown, SCSI (Small Computer System Interface) connector 125 provides connectivity for preferably up to seven or fifteen SCSI-type devices (depending on the version of SCSI supported by the embodiment). In one embodiment, I/O bridge 122 provides ISA bus 130 having one or more ISA connectors 131 (in one embodiment, three connectors are provided). In one embodiment, ISA bus 130 is coupled to I/O controller 152, which in turn provides connections to two serial ports 154 and 155, parallel port 156, and FDD (Floppy-Disk Drive) connector 157. In one embodiment, FDD connector 157 is connected to FDD 158 that receives removable media (floppy diskette) 159 on which is stored data and/or program code 160. In one such embodiment, program code 160 includes code that controls programmable system 100 to perform the method described below. In another such embodiment, serial port 154 is connectable to a computer network such as the internet, and such network has program code 160 that controls programmable system 100 to perform the method described below. In one embodiment, ISA bus 130 is connected to buffer 132, which is connected to X bus 140, which provides connections to real-time clock 142, keyboard/mouse controller 144 and keyboard BIOS ROM (Basic Input/Output System Read-Only Memory) 145, and to system BIOS ROM 146.

FIG. 1 shows one exemplary embodiment of the present invention, however other bus structures and memory arrangements are specifically contemplated. In one embodiment, I/O bridge 122 is a chip that provides connection and control to one or more independent IDE connectors 124-125, to a USB (Universal Serial Bus) port 126, and to ISA (Industry Standard Architecture) bus 130. In this embodiment, IDE connector 124 provides connectivity for up to two standard DE-type devices such as hard disk drives or CD-ROM (Compact Disk-Read-Only Memory) drives, and similarly IDE connector 125 provides connectivity for up to two IDE-type devices. In one such embodiment, IDE connectors 124 and 125 each provide the EIDE (Enhanced IDE) architecture. In one embodiment, I/O bridge 122 provides ISA bus 130 having one or more ISA connectors 131 (in one embodiment, three connectors are provided). In one embodiment, ISA bus 130 is coupled to I/O controller 152, which in turn provides connections to two serial ports 154 and 155, parallel port 156, and FDD (Floppy-Disk Drive) connector 157. In one embodiment, ISA bus 130 is connected to buffer 132, which is connected to X bus 140, which provides connections to real-time clock 142, keyboard/mouse controller 144 and keyboard BIOS ROM (Basic Input/Output System Read-Only Memory) 145, and to system BIOS ROM 146. It should be appreciated that modification or reconfiguration of information handling system 100 of FIG. 1 by one having ordinary skill in the art would not depart from the scope or the spirit of the present invention.

Figure 2:
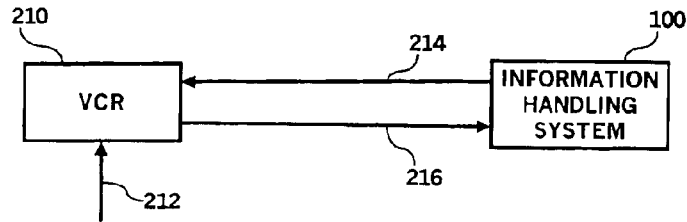
FIG. 2 is a block diagram of a system for communicating between an information handling system and a device controlled by the information handling system in accordance with the present invention.

Referring now to FIG. 2, a block diagram of a system for communicating between an information handling system and a device controlled by the information handling system will be discussed. Information handling system 100 is utilized to interface with a device such as a VCR 210 such that information handling system 100 is capable of controlling VCR 210. Information handling system 100 provides control and command signals to VCR 210 via a communications link 214. Communications link 214 is preferably a wireless link that provides for the transfer of information via a wireless medium. For example, communications link 214 is an infrared (IR) communications link that transmits IR encoded information from information handling system 100 to VCR 210 in accordance with well-known IR transmission standards such as an Infrared Developers Association (IrDA) standard. Alternatively, wireless link 214 is a radio-frequency (RF) communications link that transmits RF modulated information from information handling system 100 to VCR 210 using well-known RF modulation and transmission techniques. For a typical VCR, communications link 214 is a unidirectional link such that information is capable of flowing from information handling system 100 to VCR via communications link 214, but not in the reverse direction. VCR 210 provides an output that couples with information handling system 100 via a video optimized transmission line 216, such as a 75 ohm coaxial cable, RCA type cable, S-video cable, fiber optic cable, etc. Typically, the output provided by VCR is a video signal, and may include a separate audio signal or signals (e.g., via mono RCA audio output or stereo RCA audio outputs), or the audio and video signals may be combined into a single signal via a single output such as is the case with a 75 ohm coaxial cable type output. Normally, the flow of information via transmission line 216 is also unidirectional wherein information flows from VCR 210 to information handling system 100. The output signal provided by VCR 210 on transmission line 216 is a video signal reproduced from an information storage medium (e.g., a videocassette), or may be a pass-through of an input signal 212 received by VCR 210 with little or no processing being performed on input signal (except perhaps buffering, impedance matching, etc.), or with some signal processing being performed on input signal 212 before being provided as an output signal on transmission line 216 (e.g., tuning, color and contrast processing, etc.). In accordance with the present invention, information handling system 100 controls VCR 210 by providing a control signal to VCR via communications link 214, for example, turn on/off, start recording input signal 212, stop recording input signal 212, play back information stored on an information storage medium, fast forward, rewind, tune to a specific channel contained in input signal 212, program recording of a specific channel at a predetermined time, etc. In response to a control signal received from information handling system 100, VCR executes the requested task accordingly. The status of VCR 210 (e.g., recording, paused, playing back video, tuning to a channel, etc.) and related data (e.g., present track time/location, the number of the channel tuned to, etc.) is provided back to information handling system 100 via transmission line 216 so that the state information and data (i.e. status data) does not interfere with the output signal also transmitted via transmission line 216. In the case where the output signal is a video signal, status data is encoded into a vertical blanking interval (VBI) of the video signal. The feeding back of status information to information handling system 100 allows for the monitoring of implementation of control commands and further allows a user to be informed of status information.

Figure 3:
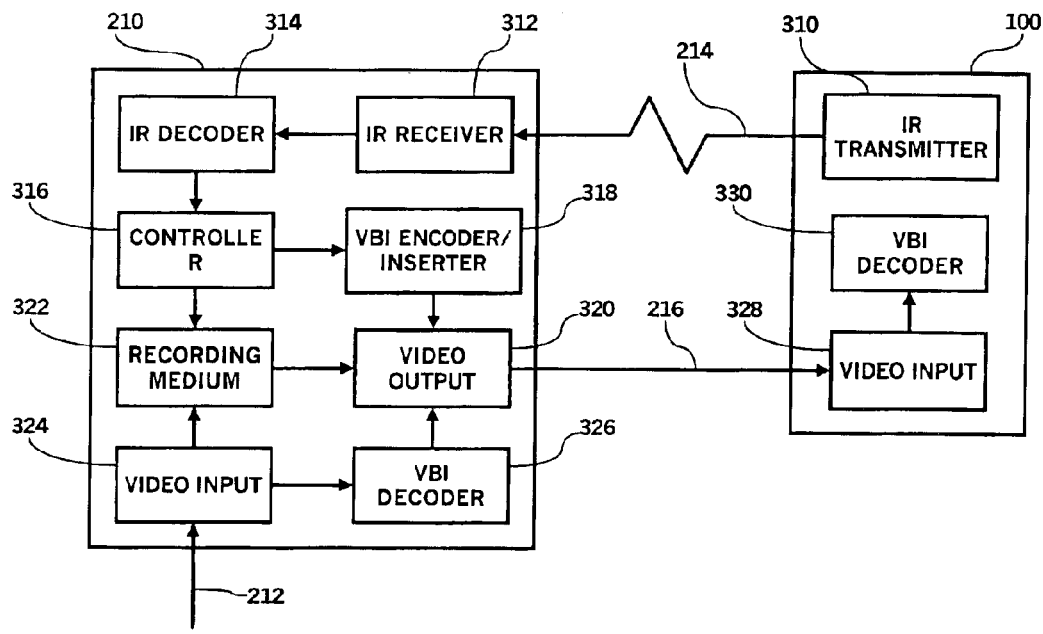
FIG. 3 is a block diagram of a preferred embodiment of a system for communicating state information in accordance with the present invention.

Referring now to FIG. 3, a block diagram of a preferred embodiment of a system for communicating state information in accordance with the present invention will be discussed. Information handling system 100 includes an IR transmitter 310 for transmitting an IR encoded control signal to VCR via IR communications link 214. VCR 210 includes an IR receiver for receiving the IR encoded control signal, an IR decoder 314 for decoding the IR encoded signal, and a controller 316 for receiving the decoded control signal and then executing the control signal appropriately. Controller 316 is also utilized for controlling the functions and operation of VCR 210 such as programming, recording, playing, etc. VCR 210 includes a recording medium system 322 for recording information onto an information storage medium (e.g., magnetic videocassette tape), and for playing back information stored on an information storage medium (e.g., movies, television programs, etc.) that is provided to a video output circuit 320 for providing the played back information as an output signal on transmission line 216. Input signal 212 is provided to a video input circuit 324 that provides input signal to recording medium system 322 and video output circuit 320. A VBI decoder 326 decodes information previously encoded in input signal 212, for example, closed captioning information.

Upon receiving a control signal from information handling system 100, controller 316 provides data such as status information to VBI encoder and inserter 318 that encodes the data in a vertical blanking interval of the output signal provided by video output circuit 320. Data may also be encoded onto the output signal periodically such that the data may be periodically updated. Also, status information may be provided when the status information has changed, for example, playback counter information may be continuously provided as data encoded in a VBI of the output signal. Thus, VCR 210 may provide status information continuously, at predetermined intervals, when requested by information handling system 100, or in response to a received control signal, etc. Information handling system 100 receives the output signal provided by VCR 210 with a video input circuit 328 disposed in information handling system 100. A VBI decoder 330 decodes the data from the output signal such that the data may be interpreted by information handling system 100. The decoded data is then available to be processed if required (e.g., by processor 102) or provided to a user (e.g., provided to VGA port 129 for display on a display coupled to information handling system 100). The received output signal is capable of being processed, if required, stored on an information storage medium (e.g., medium 159), provided to VGA port 129 for reproduction on a display coupled to information handling system 100, etc. The system as shown and described with respect to FIG. 3 thereby allows information such as status data to be communicated from VCR 210 to information handling system 100 to provide monitoring and control of VCR 210 with information handling system. In a preferred embodiment, the output signal provided by VCR 210 conforms with an NTSC standard, and data is encoded onto the output signal in conformance with an Electronic Industry Association (EIA) standard. For example, data is encoded according to EIA standard EIA-608 "Recommended Practice for Line 21 Data Service" that defines a protocol for the transmission of data on field 2, line 21 of the Vertical Blanking Interval (VBI) of an NTSC signal such as described with respect to the Extended Data Services (EDS) of parts 1.6, 5.6, 6 and 10 of EIA-608. In such an embodiment, using a specific EDS packet class and sub-packet format would allow the encoding device to store and send state information along with the signal as discussed herein. The packet class to be used may be the "Miscellaneous" class (07h-03h character pair) to identify the packet as one that holds a Supplemental Data Location (EIA-608 parts 6.5.4) that indicates on which line of the VBI the data is disposed. At the location specified, data is encoded by VBI encoder/inserter 310 for receipt by VBI decoder 330. Each packet is capable of containing different types of data using the first byte of the pair to identify the contents of the current packet wit the remaining bytes containing data. The format of the data is not required to be in compliance with any particular standard, however a standard packet format and VBI location may be optimally utilized to provide compatibility between hardware devices (such as VCR 210) from differing manufacturers. VBI decoder 330 reads data packets that utilize the Supplemental Data Location to detect the existence of data packets encoded in other lines of the VBI. In such an embodiment, VBI encoder/inserter 318 can dynamically select in which line of the VBI to encode the data. In the event all lines are in use, a new data packet may be interleaved with a previously existing data packet such as described in EIA-608 part 5.6.

Figure 4:
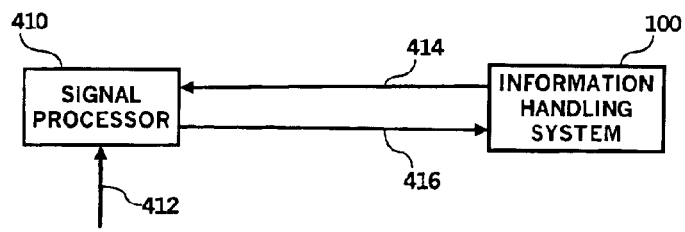
FIG. 4 is a block diagram of a communications system in accordance with the present invention.

Referring now to FIG. 4, a block diagram of a communications system in accordance with the present invention will be discussed. The communications system shown in FIG. 4 is substantially similar to the communication system shown in and discussed with respect to FIG. 2 wherein VCR may be any device or signal processor 410 coupled with and controlled by information handling system 100 in a manner similar to VCR 210. For example, signal processor 410 may be a video laser disc player, a digital versatile disk (DVD) player, a Moving Pictures Expert Group (MPEG) compliant video player, or any other similar audio, video or multimedia player or the like. Thus, signal processor 410 receives a control signal from information handling system 100 whereby information handling system is capable of controlling signal processor 410. Signal processor receives an input signal 412 and provides an output signal to information handling system 100 via transmission line 416. Data such as status information may be encoded onto the output signal by signal processor 410 such as in a VBI in the case where the output signal is a video signal. Information handling system 100 decodes the data from the output signal whereby the data may be interpreted accordingly such that state information may be communicated from signal processor 410 to information handling system 100.

Figure 5:
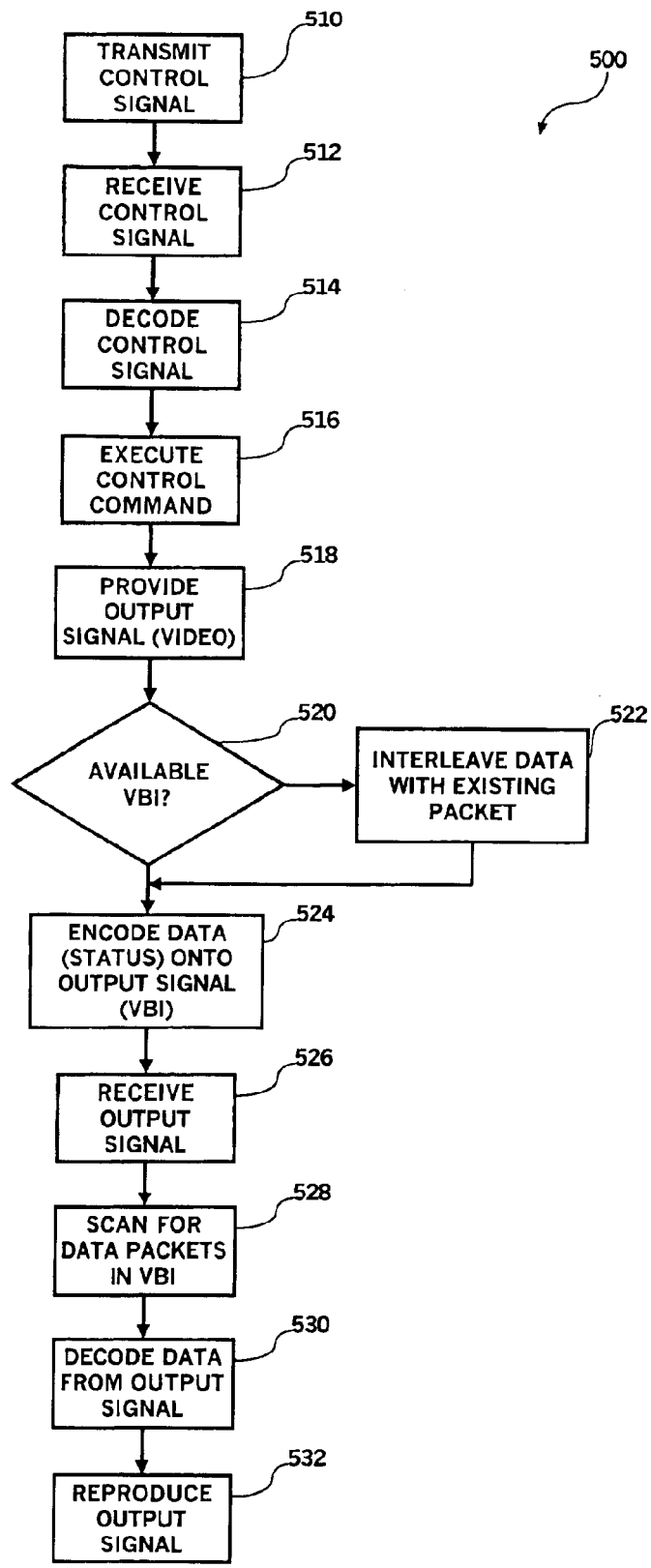
FIG. 5 is a flow diagram of a method for communicating state information in accordance with the present invention.

Referring now to FIG. 5, a flow diagram of a method for communicating state information in accordance with the present invention will be discussed. Method 500 may be implemented as a program of instructions executed by processor 102 of information handling system 100 and/or controller 316 of VCR 210 or signal processor 410, alone or in combination, that is storable on an information storage medium, such as medium 159, readable by an information handling system or similar computer system. A control signal is transmitted at step 510 from information handling system 100 and received by VCR 210 or signal processor 410 at step 512. The control signal is decoded at step 514, and a control command represented by the control signal is executed at step 516 as appropriate. An output signal is provided at step 518 by VCR 210 or signal processor 410. A determination is made at step 520 whether there is an available VBI in the output signal in which to encode a packet of data. In the event there is no available VBI, a new data packet is interleaved with a previously existing data packet at step 522. Data is then encoded into a VBI at step 524. The encoded data may be, for example, representative of a status of VCR 210 or signal processor 410 or the status of execution of the command encoded in the control signal. The output signal is received by information handling system 100 at step 526 which then scans the output signal at step 528 for a VBI having an encoded data packet. When a VBI having an encoded data packet is located, the data is decoded from the output signal at step 530 such that the data may be interpreted and acted upon as appropriate, including providing the status information to a user. The output signal is reproduced at step 532 by information handling system.

Although the invention has been described with a certain degree of particularity, it should be recognized that elements thereof may be altered by persons skilled in the art without departing from the spirit and scope of the invention. One of the embodiments of the invention can be implemented as sets of instructions resident in the main memory 116 of one or more computer information handling systems configured generally as described in FIG. 1. Until required by the computer system, the set of instructions may be stored in another computer readable memory such as information storage medium 159 of FIG. 1, for example in a hard disk drive or in a removable memory such as an optical disk for utilization in a CD-ROM drive, a floppy disk for utilization in a floppy disk drive, a floptical disk for utilization in a floptical drive, or a personal computer memory card for utilization in a personal computer card slot. Further, the set of instructions can be stored in the memory of another computer and transmitted over a local area network or a wide area network, such as the Internet, when desired by the user. Additionally, the instructions may be transmitted over a network in the form of an applet (a program executed from within another application) or a servlet (an applet executed by a server) that is interpreted or compiled after transmission to the computer system rather than prior to transmission. One skilled in the art would appreciate that the physical storage of the sets of instructions, applets or servlets physically changes the medium upon which it is stored electrically, magnetically, chemically, physically, optically or holographically so that the medium carries computer readable information.

It is believed that the method and apparatus for communicating state information using vertical blanking interval of the present invention and many of its attendant advantages will be understood by the forgoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. A system, comprising:
   a signal processor for receiving a signal to be processed, the signal processor comprising an information storage media player; and
   an information handling system for receiving an output signal provided by said signal processor the information storage media player, the output signal being a video signal that is representative of at least a portion of the input signal,
   wherein said information handling system provides a control signal to said signal processor and said signal processor encodes data onto the output signal in response to the control signal such that the encoded data is decodable by said information handling system; and
   wherein the information storage media player receives and decodes the control signal from the information handling system, and, in response thereto, encodes status data within a vertical blanking interval of the output signal, the encoded status data being decodable by the information handling system for acquiring the status of the information storage media player.

2. A system as claimed in claim 1, said signal processor including a data encoder for encoding the data onto the output signal, and said information handling system having a data decoder for decoding the data from the output signal received from said signal processor.

3. A system as claimed in claim 1, said information handling system having a transmitter for transmitting the control signal to said signal processor, and said signal processor having a receiver and decoder for receiving and decoding the control signal received from said information handling system.

4. A system as claimed in claim 1, said information handling system being capable of reproducing the output signal received from said signal processor.

5. A system as claimed in claim 1, the signal to be processed and the output signal provided by said signal processor being video signals.

6. A system as claimed in claim 1, the output signal provided by said signal processor being an NTSC compliant video signal.

7. A system as claimed in claim 1, the output signal provided by said signal processor being an NTSC compliant video signal, the data being encoded onto the vertical blanking interval of the NTSC compliant video signal in compliance with an Electronic Industry Association standard.

8. A system as claimed in claim 1, the control signal being a wireless signal.

9. A system as claimed in claim 1, wherein said information storage media player is a VCR player.

10. A system as claimed in claim 1, wherein said information storage media player is a DVD player.

11. A method, comprising:

transmitting a control signal to a signal processor from an information handling system that controls the signal processor, the signal processor comprising an information storage media player;

receiving and decoding the control signal;

providing a video signal from the signal processor to the information handling system; and encoding data onto the provided output signal in response to the control signal;

wherein the information storage media player receives and decodes the control signal from the information handling system, and, in response thereto, encodes status data within a vertical blanking interval of the output signal, the encoded status data being decodable by the information handling system for acquiring the status of the information storage media player.

12. A method as claimed in claim 11, further comprising the step of decoding the data from the provided output signal.

13. A method as claimed in claim 11, the data being indicative of a status of the signal processor.

14. A method as claimed in claim 11, further comprising the steps of:

determining that the available vertical blanking interval is not available during a predetermined time after decoding the control signal; and interleaving the data in a previously existing data packet.

15. A program of instructions storable on a computer readable medium for causing an information handling system to execute a series of steps, the steps comprising:

transmitting a control signal from an information handling system to a signal processor that the information handling system controls;

receiving and decoding the control signal;

providing an output signal from the signal processor to the information handling system; and encoding data onto the output signal in response to the control signal;

wherein the output signal provided by said signal processor is a video signal and the signal processor comprises an information storage media player capable of encoding the data onto an available vertical blanking interval of the output signal, the information storage media player for receiving and decoding the control signal from the information handling system, and, in response thereto, encoding status data within a vertical blanking interval of the output signal, the encoded status data being decodable by the information handling system for acquiring the status of the information storage media player.

16. A program of instructions as claimed in claim 15, the steps further including the step of decoding the data from the output signal.

17. A program of instructions as claimed in claim 15, the data being indicative of a state of the signal processor.

18. A program of instructions as claimed in claim 15, the steps further comprising the steps of:

determining that the available vertical blanking interval is not available during a predetermined time after decoding the control signal; and interleaving the data in a previously existing data packet.

19. A convergence system capable of communicating state information using a vertical blanking interval of a video signal, comprising:

a computer system for controlling the convergence system;

a television monitor coupled to the computer system for displaying video images;

an information storage media player coupled to at least one of the computer system and the television monitor for receiving a storage medium containing video information stored thereon and providing an output video signal having a vertical blanking interval to at least one of the computer system and the television monitor; and wherein the information storage media player receives and decodes a control signal from the computer system and, in response thereto, encodes status data within the vertical blanking interval of the output video signal, the encoded status data being decodable by the computer system for acquiring the status of the information storage media player.

20. The convergence system as claimed in claim 19, wherein the information storage media player is capable of determining that an available vertical blanking interval is not available during a predetermined time after decoding the control signal and interleaving the data in a previously existing data packet.

21. The convergence system as claimed in claim 19, wherein the status data includes recording, paused, playing back, and channel information.

22. The convergence system as claimed in claim 19, wherein information storage media player comprises at least one of a video cassette recorder (VCR), a DVD player, a DVD player and recorder and a video laser disc player.

* * * * *